INVENTORS.
Erich Leckzik &
Wolfgang Hertzsch

ATTORNEYS 3,331,495
MOISTURE-PROOF PUSH-THROUGH PACKAGE
Erich Leckzik and Wolfgang Hertzsch, Berlin, Germany, assignors to Schering A.G., Berlin, Germany
Filed Dec. 6, 1965, Ser. No. 511,596
Claims priority, application Germany, Jan. 28, 1965, Sch 36,452
4 Claims. (Cl. 206—42)

This invention relates to a moisture-proof push-through package. More particularly, it relates to packages containing openings for accommodating pharmaceutical items, such as suppositories, capsules, tablets, pills or powders which are to be protected from moisture and air. Packages of this type usually consist of a foil of plastic capable of being deep drawn which is provided with depressions or cups or recesses for holding the items and to which an aluminum foil is sealed for closing the depressions or cups. Since the plastics capable of being deep drawn are permeable to the atmosphere, the push-through packages heretofore employed were not suitable for use in such areas, as in tropical countries, in which the atmospheric humidity is relatively high.

In order to remedy this disadvantage of the heretofore known and used push-through packages, such packages which were intended for shipping and storage in the tropics were enclosed in aluminum pouches or pockets. This, it was found, is not a satisfactory solution, particularly since the protective effect of the aluminum pouch is terminated by opening it for use of part of the contents, whereupon exposure to the atmosphere affected the drug.

It is an object of the present invention to provide a push-through package which insures a safe seal of the drugs even in the tropics against atmospheric moisture. A package of the type herein described and illustrated as an example does not require the package as a whole to be further wrapped, since each individual dose of the drug can be readily removed and used, and the protective effect of the outer layer is largely preserved even after initial use of the package.

Another object of the present invention, is to provide a simplified manufacturing process for packaging individual doses of drugs as compared with the state of the art, and to provide a significant saving in materials.

A preferred embodiment of the invention is illustrated in the accompanying drawings, wherein.

Figure 1:
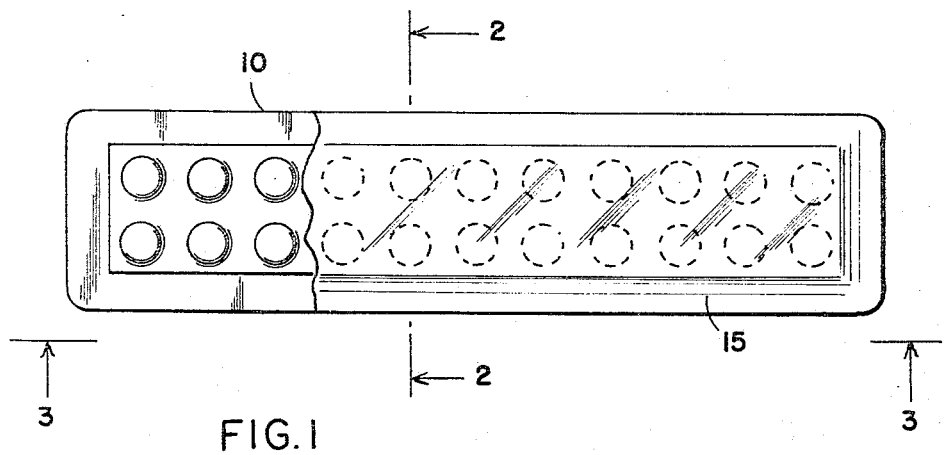
FIG. 1 is a plan view of a preferred embodiment of the invention.
Figure 3:
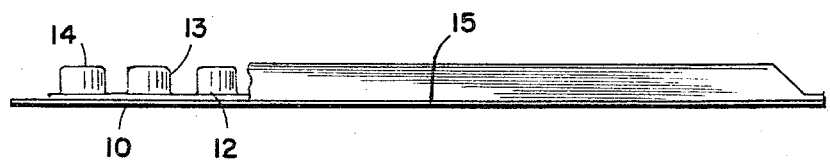
FIG. 3 is a longitudinal, sectional view of the embodiment taken on line 3—3 of FIG. 1.
Figure 2:
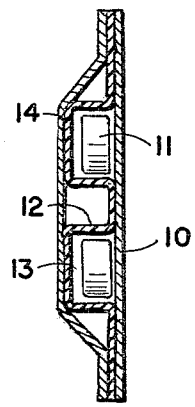
FIG. 2 is a sectional view taken on line 2—2 of FIG. 1.

Referring now to the drawings, wherein similar references refer to like parts throughout, there is provided a base or support 10, preferably an aluminum foil. Said support acts also as a closure for holding, for example, a tablet of suitable drug or the like, 11. Superimposed above the aluminum foil and adhering thereto in any suitable manner, there is provided a plastic foil 12 which has recesses, cups or depressions 13, for holding therein said tablets 11. It is to be noted that the plastic may be of any suitable type, such as: PVC, polyethylenes, polypropylenes or any other suitable polymerized, transparent product. Also, cups 13 are preformed so that the tablet, for example, may be readily inserted usually by machine into the cups; whereupon the open end of the cups is then coated with foil 10. In order to prevent moisture from penetrating the plastic material in which case the drug most likely would deteriorate, there is provided an outer form of film 14 of aluminum foil which coats the cupped side of the plastic so that the edges 15 of the foil are completely merged or welded with the layer of aluminum 10. Such a combination forms a tight moisture and air proof seal.

From the foregoing, it is to be noted that the novel, hermetically sealed push-through package is characterized by the fact that an air- and moisture-proof foil, more specifically an aluminum foil, is affixed, preferably sealed to the underside of the usual push-through package. Furthermore, it will be noted that we have provided a compact air- and water-tight push-through package for the protection of drugs from oxidation or water deterioration.

While a preferred embodiment of the invention as illustrated has been described, it is to be noted that modifications as to form, arrangement of parts and use of materials may be made without departing from the spirit and scope of the invention as claimed.

We claim:
1. A push-through package for dragées, capsules, pills, tablets, suppositories and the like comprising a moisture-impervious flat aluminum foil base, a plastic foil of sheet-like material capable of being deep drawn forming cups for accommodating said dragées, capsules, pills, tablets, suppositories and the like therein, said foil being attached to said foil base on one face thereof, and a moisture-proof foil covering said plastic foil and forming with the aluminum foil base an hermetic seal for said plastic foil.

2. A package according to claim 1, wherein the plastic foil is sandwiched between a pair of metal flexible foils whose edges are laminated.

3. A package according to claim 1, in which the plastic foil has a plurality of cups arranged seriatim for accommodating a drug therein.

4. A moisture-proof push-through package wherein the aluminum foil base is flat, and the plastic foil with its spatially arranged cups adheres to the base and contains therein a medicament, and an air- and moisture-proof aluminum foil forms an outer coating and is adapted with the aluminum foil base to form a seal therewith for the medicaments enclosed in the plastic cups, said aluminum foils being yieldable under pressure to individually release the medicament from each cup as desired.

References Cited

UNITED STATES PATENTS

| | | | |
|---|---|---|---|
| 2,121,988 | 6/1938 | Salfisberg | 206—46 |
| 2,557,794 | 6/1951 | Nicolle | 206—46 |
| 2,621,782 | 12/1952 | Reifers | 206—42 |
| 2,982,457 | 5/1961 | D'Alelio. | |
| 3,054,503 | 9/1962 | Hartman et al. | 206—42 |
| 3,142,599 | 7/1964 | Chavannes | 156—292 X |
| 3,193,434 | 7/1965 | Weiss | 161—69 X |

THERON E. CONDON, Primary Examiner.

J. M. CASKIE, Assistant Examiner.